(12) United States Patent
Ohmuro

(10) Patent No.: US 7,450,855 B2
(45) Date of Patent: Nov. 11, 2008

(54) OPTICAL DETECTION APPARATUS AND FREE-SPACE OPTICS COMMUNICATION APPARATUS

(75) Inventor: Ryuji Ohmuro, Tochigi-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 569 days.

(21) Appl. No.: 11/001,818

(22) Filed: Dec. 1, 2004

(65) Prior Publication Data

US 2005/0121601 A1 Jun. 9, 2005

(30) Foreign Application Priority Data

Dec. 4, 2003 (JP) ............................. 2003-406175

(51) Int. Cl.
*H04B 10/00* (2006.01)
(52) U.S. Cl. ...................... 398/123; 398/118; 398/119
(58) Field of Classification Search ................ 398/119, 398/118, 122, 123, 131, 129, 121; 250/216
See application file for complete search history.

(56) References Cited

U.S. PATENT DOCUMENTS

| | | | |
|---|---|---|---|
| 5,475,520 A * | 12/1995 | Wissinger | 398/118 |
| 5,627,669 A * | 5/1997 | Orino et al. | 398/129 |
| 6,686,582 B1 * | 2/2004 | Volcker et al. | 250/216 |
| 6,775,480 B1 * | 8/2004 | Goodwill | 398/158 |
| 2003/0147652 A1 * | 8/2003 | Green et al. | 398/118 |

FOREIGN PATENT DOCUMENTS

JP 5-133716 5/1993

* cited by examiner

*Primary Examiner*—M. R. Sedighian
(74) *Attorney, Agent, or Firm*—Morgan & Finnegan LLP

(57) ABSTRACT

There is provided an optical detection apparatus, comprising a light-receiving element, an optical system which forms a spot of light flux on a light-receiving surface of the light-receiving element by externally incident light flux, and an information generating section which generates information with respect to a position of the spot based on the output from the light-receiving element. The optical system includes an optical element array having a plurality of optical element portions, and a plurality of spots formed by the plurality of optical element portions substantially overlap to each other on the light-receiving surface.

11 Claims, 9 Drawing Sheets

L1 
L2 
L3 
L4 
L5

OPTICAL DETECTION APPARATUS AND FREE-SPACE OPTICS COMMUNICATION APPARATUS

BACKGROUND OF THE INVENTION

1. Field of the Invention

The present invention relates to a free-space optics communication apparatus and an optical detection apparatus, which allow apparatuses, which are arranged opposite to each other and spaced with a predetermined interval, to perform bidirectional information communication.

2. Description of Related Art

In Japanese Patent Application Laid-Open No. H05-133716, the free-space optics communication apparatus comprising an optical axis correction unit which detects an incident direction of light flux emitted from a counterpart apparatus and emits its light flux toward the incident direction is disclosed. A characteristic structure of the conventional free-space optics communication apparatus is shown in FIG. 12. The free-space optics communication apparatus has a light-transmitting optical system and a light condensing optical system as shown in FIG. 12, and these two apparatuses having substantially the same structure are arranged opposite to each other and spaced from each other to perform bidirectional communication.

Laser lights emitted from a laser diode 1, which are linearly polarized in the direction perpendicular to the paper surface of the same figure, are converted to substantially parallel light flux by a lens unit 2 having a positive power and are reflected at a boundary surface (a polarized light separating surface) of a polarization beam splitter 3. And the reflected light is reflected again by a mirror 4 of an optical axis direction varying section 10, and then transmitted as sent light LA from an apparatus A to an apparatus B which is not shown.

The received light LB which is emitted from the counterpart apparatus and is incident on the main apparatus is reflected by the mirror 4 and transmitted through the polarization beam splitter 3 to reach a received light splitting mirror 5. In this case, about 90% of the received light LB is transmitted through the received light splitting mirror 5 and is condensed at a main signal detection light-receiving element 6 by a lens unit 7 having a positive power. And the rest of about 10% is reflected by the received light splitting mirror 5 and is condensed at a position detection light-receiving element 8 by a lens unit 109 having a positive power.

An optical element on whose attached surface a multi-layered thin film is deposited is used as the polarized beam splitter 3. This multi-layered thin film is configured so that S polarized light is reflected and P polarized light is transmitted. In order to attain the most efficient light transmission and reception using the polarized beam splitter 3, it is preferable to have the received light LB being P polarized light when the sent light LA is S polarized light.

Moreover, in order to perform the most efficient light transmission and reception by arranging the light-transmitting apparatus and the light-receiving apparatus having the same structure arranged opposite to each other, it is preferable to have an "optical axis on the beam splitter side" 13 disposed to be inclined behind the paper surface of the same figure which is a common optical axis for transmission and reception, such that the polarization direction of the sent light LA and that of the received light LB are perpendicular to each other when these two apparatuses are arranged to face each other.

In addition, in order to perform communication having a large amount of transmitting information, small elements such as an avalanche photodiode, which has a diameter of an effective light-receiving area less than 1 mm, should be employed for a main signal detection light-receiving element 6. Accordingly, in order to dispose the received light LB within the effective light-receiving area of the main signal detection light-receiving element 6, an angle of the mirror 4 is adjusted so that the position of the main signal detection light-receiving element 6 is aligned with that of a position detection light-receiving element 8. Thus, the optical axis of the received light LB is arranged to be substantially at the center of the position detection light-receiving element 8.

In this case, in order to effectively transmit the sent light LA toward the counterpart apparatus, the optical axis of the sent light LA, namely, the laser diode 1 preferably coincides with the center of the position detection light-receiving element 8.

Position deviation information of a spot SP, formed on the light-receiving surface of the position detection light-receiving element 8 by the received light LB, is sent by a signal processing section 11 to an optical axis direction control section 12 as an optical axis deviation correction signal, and the optical axis direction control section 12 sends an optical axis direction changing signal to an optical axis direction varying section 10.

Further, based on this optical axis direction polarized light signal, the angle of the mirror 4 is adjusted so that the optical axis of the sent light LA coincides with that of the received light LB.

Such control is continued during communication, and the bidirectional communication apparatuses, which are disposed opposite to each other and spaced with a predetermined interval, are corrected mutually such that the optical axis of the received light LB transmitted from the counterpart apparatus coincides with the center of the position detection light-receiving element 8. Thus, the optical axis of the transmitted light LB can be arranged to coincide with that of the received light LA.

FIG. 13 shows a structure of a position detecting element in accordance with the related art. A four-division sensor 13 which is divided into four elements 14 is generally employed as the position detection light-receiving element 8. However, when such a light-receiving element is used for the position detection light-receiving element 8, it is preferable to allocate a proper area to the spot SP of the received light LB so as to repress a rapid change of a sensor output when the light crosses a separation zone 15 between the separated elements. Accordingly, the position of the light-receiving surface is generally set at a position defocused from the condensing point.

However, in the free-space optics communication apparatus for performing light transmission and reception in the atmosphere, the transmission is affected by fluctuation phenomena of transmitted beams caused by vibrations of an installed position of the apparatus or fluctuations of the atmosphere. These atmospheric fluctuations may be classified into a macro-fluctuation in which the whole transmitted light fluctuates and a micro-fluctuation in which the intensity distribution of the transmitted light fluctuates. In this case, although the macro-fluctuation of the atmosphere may be overcome along with the vibration associated with the installed position, another method should be taken into consideration to deal with the micro-fluctuation.

FIG. 14 is a conceptual diagram in which the micro-fluctuation of the atmosphere is modeled. Reference character W denotes a spread when the received light LB emitted from the counterpart apparatus reaches the main apparatus. The atmosphere is a non-uniform medium which has a convection current caused by pressure or temperature differences and whose refractive index varies not only in space but also in time. As a result, the received light LB is diffused, and a portion W1 having a strong intensity and a portion W2 having a weak intensity appear in the spread W.

This intensity distribution varies as a function of time, so that W2 is seen as fluctuating in the spread W where the sent light LA is diffused. This is referred to as the micro-fluctuation of the atmosphere, and this fluctuation occurs randomly. In the free-space optics communication apparatus of the related art, the light-receiving surface of the position detection light-receiving element 8 is disposed at a position defocused from the condensing point, so that, in a state of the micro-fluctuation of the atmosphere as described above, the spot SP having a proper area on the light-receiving surface does not have a uniform intensity distribution and the distribution of the light intensity at a beam taking inlet M into an apparatus corresponding to an entrance pupil is transmitted as it is. (See FIG. 15.)

FIG. 16 shows a feature of the spot SP formed with light flux collected from the beam taking inlet M. The spot SP of a diameter T has a portion P1 with a strong intensity (unshaded) and a portion P2 with a weak intensity shown with oblique lines. The center of gravity of spot light PC, which is different from the center of the light flux BC, is judged to be an optical axis, and there occurs a deviation toward the optical axis direction of the sent light LA by an angle associated with the amount of position deviation S thereof. As a result, the sent light LA is deviated from the counterpart apparatus, which causes the problem in that communication cannot be performed.

In addition, the four-division sensor has been described up to now, but the defocusing problem may be avoided by repressing a rapid output change by employing a sensor referred to as a position sensitive detector (PSD) such as a semiconductor image position detecting element, which does not have the above-mentioned separation zone. However, in an apparatus whose communication distance ranges from several tens meters to several kilometers, it is difficult to dispose the position detection light-receiving element 8 at a place nearest to the best position.

Moreover, such apparatuses should be adjusted to have the following position relationship between the laser diode 1 and the lens unit 2. In case of a short distance, the beam is made broad so that the sent light LA does not adversely affect on human eyes. In case of a long distance, the beam is made narrow so that the beam energy securely reaches the counterpart apparatus. Therefore, the defocusing method cannot be avoided on the position detection light-receiving element 8.

Accordingly, the defocusing method should be taken into consideration in the case of PSD. The PSD should detect the center of gravity position of the spot light even in the defocused state, and there is no difference from the case of the four-division sensor.

The present invention is made to overcome the above-mentioned problems, and it is an object of the present invention to provide a free-space optics communication apparatus and an optical detection apparatus, which are capable of performing stable communication by reducing an optical axis deviation correction error regardless the non-uniform intensity distribution of the received light due to the micro-fluctuation of the atmosphere.

SUMMARY OF THE INVENTION

According to one aspect of the present invention, there is provided an optical detection apparatus, comprising a light-receiving element, an optical element array which form a plurality of spots of light flux on a light-receiving surface of the light-receiving element with externally incident light flux, and an information generator which generates information with respect to each of positions of the plurality of spots based on an output from the light-receiving element. Here, the plurality of spots are formed on the light-receiving surface so as to substantially overlap to each other.

According to another aspect of the present invention, there is provided free-space optics communication apparatus for performing communication with a counterpart apparatus by light flux transmitted through space, comprising a light-receiving element, an optical element array which form a plurality of spots of light flux on a light-receiving surface of the light receiving element with the light flux incident from the counterpart apparatus, and an information generator which generates information with respect to each of positions of the plurality of spots based on an output from the light receiving element. Here, the plurality of spots are formed on the light-receiving surface so as to substantially overlap to each other.

Features of the optical detection apparatus and the free-space optics communication apparatus of the present invention will become apparent from the following detailed description of a preferred embodiment thereof taken in conjunction with the accompanying drawings.

DETAILED DESCRIPTION OF THE PREFERRED EMBODIMENTS

Hereinafter, an embodiment of the present invention will be described.

Figure 1:
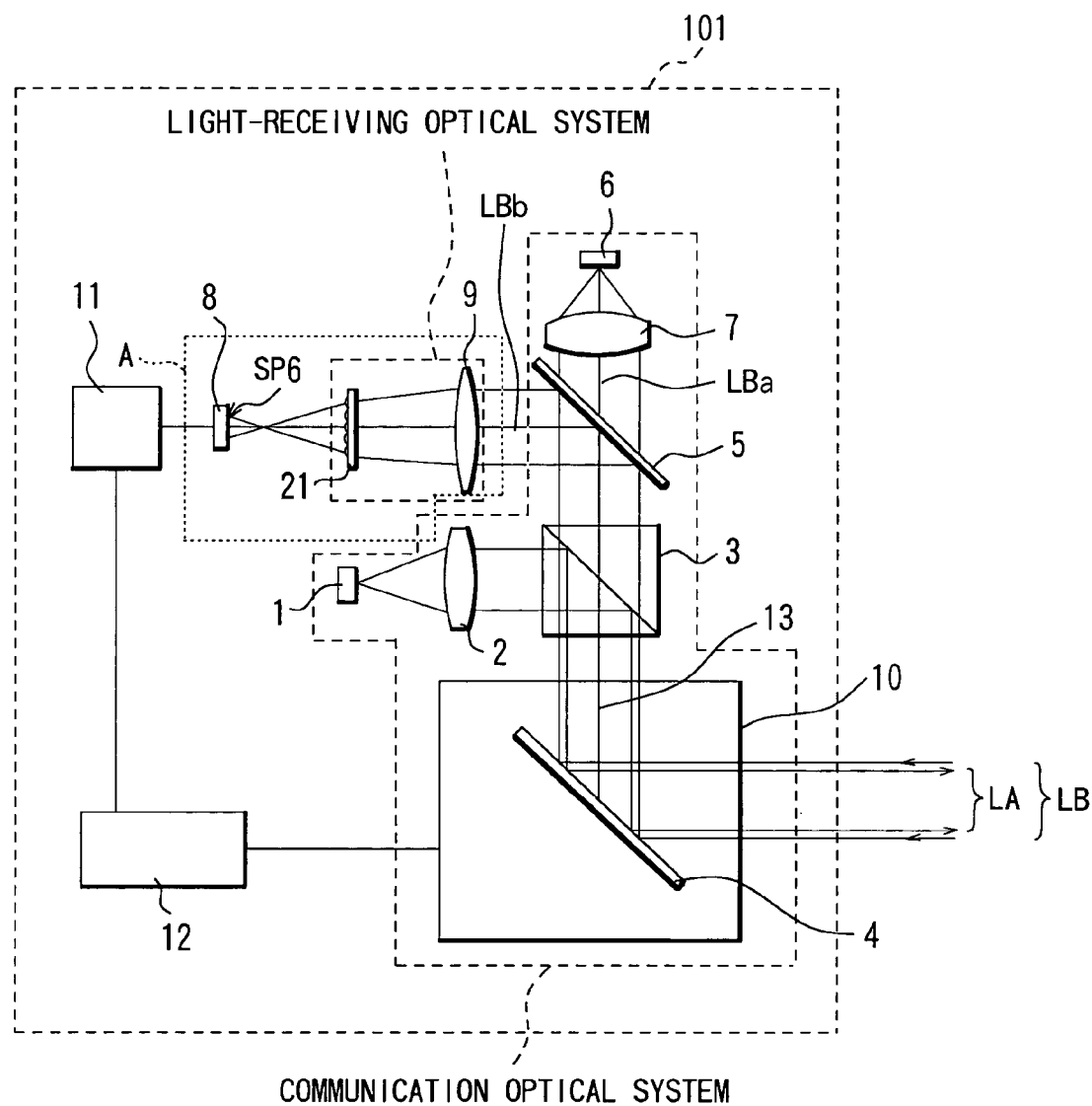
FIG. 1 shows a block diagram of a free-space optics communication apparatus in accordance with an embodiment of the present invention.
Figure 1:
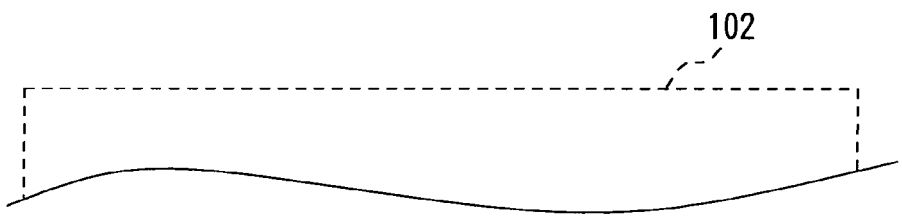

FIG. 1 shows a block diagram of a first free-space optics communication apparatus 101 which is an embodiment of the present invention. In addition, elements having the same functions are denoted by the same reference numerals as those of the conventional invention throughout the specification as much as possible. Laser lights emitted from a laser diode 1, which is linearly polarized in a direction perpendicular to the paper surface of the same figure, is converted to substantially a parallel light flux by a lens unit 2 having a positive power. This substantially parallel light flux is reflected at a boundary surface of a polarized beam splitter 3, further reflected by a mirror 4 of an optical axis direction varying section 10, and then transmitted as sent light LA from the first free-space optics communication apparatus 101 to a second free-space optics communication apparatus 102.

A received light LB, which is substantially parallel to the paper surface from the second free-space optics communication apparatus and substantially linearly polarized, is incident on the first free-space optics communication apparatus 101, reflected by the mirror 4, then transmitted through the polarization beam splitter 3, and reaches to the received light splitting mirror 5.

In this case, most of the received light LB is transmitted through the received light splitting mirror 5 to be condensed on a light-receiving surface of a main signal detection light-receiving element 6 by a lens unit 7 having a positive power. The rest of the received light LBb reflected by the received light splitting mirror 5 is condensed by a lens unit 9 having a positive power, then transmitted through the lens array 21, and reaches to a light-receiving surface of a position detection light-receiving element 8.

Figure 2:
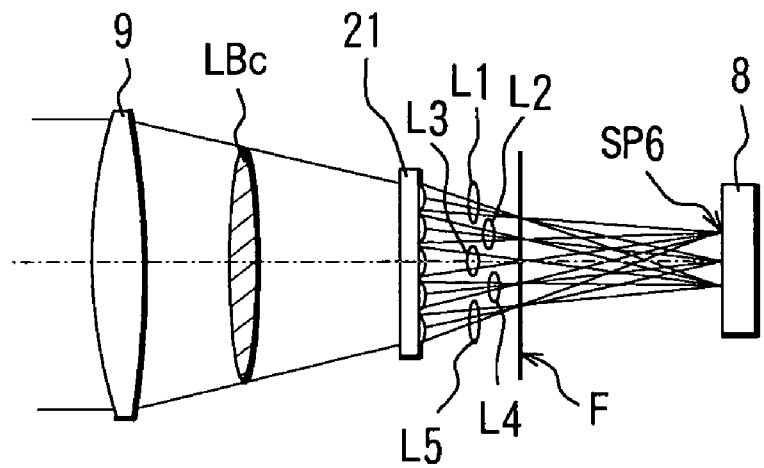
FIG. 2 shows a cross-sectional view of an element of the free-space optics communication apparatus in accordance with the embodiment of the present invention.

Next, a function of the lens array 21 will be described with reference to FIG. 2. FIG. 2 shows a detailed diagram of a portion of the first free-space optics communication apparatus 101 which is surrounded by the dotted line A in FIG. 1. In addition, FIG. 2 is reversed left-side to right on the paper surface of FIG. 1. The received light LBb guided to the lens unit 9 is condensed on the lens unit 9. The condensed light flux is incident on the lens array 21 disposed at a defocused position where focusing is not made yet.

Figure 3A:
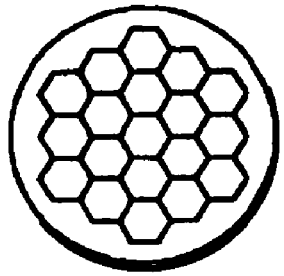
FIG. 3 shows a front view of a lens array.
Figure 3B:
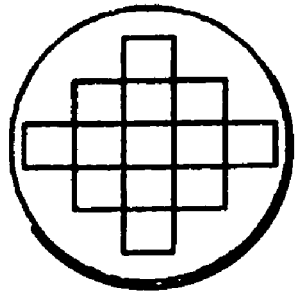

The lens array 21 is configured on a flat glass plate by forming several micro lenses with various radii of curvature shaped as hexagon or quadrangle shown in FIG. 3A or 3B. This lens array 21 is fabricated by a molding method in which a glass material softened by heating is poured into a metallic mold having a lens array shape, a method for forming micro lenses with a high molecular material such as a transparent plastic on a surface of glass, a method employing integral molding only using plastic, or the like. Each micro lens constituting the lens array 21 may have a light diffusion function or a light condensing function.

In addition, the lens array 21 may be formed on a substrate having a lens shape. Furthermore, a circle or a triangle shape may be possible in addition to the hexagon or quadrangle. In addition, the lens array having only two micro lenses may be possible, however, it is preferable to dispose at least nine lenses within an effective light flux so as to repress the problem in that communication cannot be performed.

However, in order to avoid the reduction of light efficiency due to the diffusion resulted from refraction, the size of the lens may become too small and it is difficult to fabricate a fine lens with a large curvature radius. And, when the distance between the lens array 21 and the position detection light-receiving element 8 cannot be properly maintained, the number of micro lenses needs to be limited.

In this case, the light fluxes emitted from the micro lenses of the lens array 21 are numbered as L1 to L5 in order from the upper side of the figure. The light flux L3, which includes the optical axis of the lens 9, is once condensed on a focal plane F, and then spread until it reaches to the position detection light-receiving element 8.

L1, L2, L4, and L5 are light fluxes emitted from the fine lenses, which are off-axial with respect to the lens 9. In a manner similar to the case of the light flux L3, these light fluxes are once condensed near the focal plane F, and then spread until they reach the position detection light-receiving element 8.

The position detection light-receiving element 8 is disposed near a position where the light fluxes L1 to L5 reached to the position detection light-receiving element 8 are overlapped most on the light-receiving surface. The reason to specify being "the near" is as follows. There is a case where the aberration relation between the lens 9 and the lens array 21 cannot be clearly defined, or a case where a position deviation may be acceptable at the level of not causing any operational problems. Next, a function of the lens array 21 will be described with reference to FIG. 4.

Figure 4:
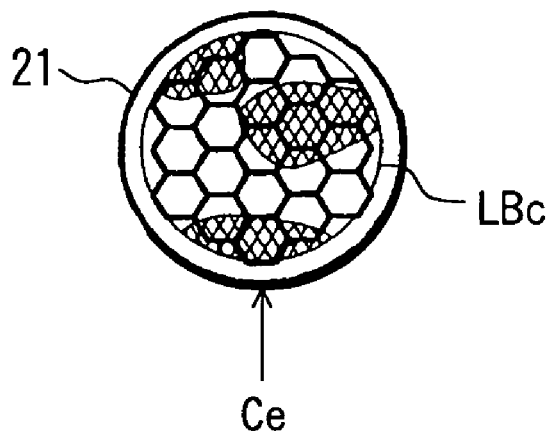
FIG. 4 shows a cross-sectional view of an element of the free-space optics communication apparatus in accordance with the present invention.
Figure 16:
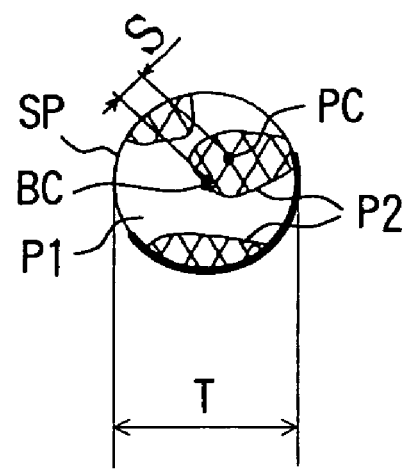
FIG. 16 shows a detailed drawing of the spot shown in FIG. 15.

FIG. 4 shows a diagram in which the lens array 21 is overlaid on the intensity distribution of the light flux LBc (which is the same as the intensity distribution of the spot SP shown in FIG. 16). It can be seen that the light flux LBc is divided into areas by each micro lens (hereinafter, referred to as a cell lens) of the lens array 21. Five cell lenses shown is the arrow direction indicated by Ce include a cross section shown in FIG. 2. That is to say, they are lenses through which the light fluxes L1 to L5 are emitted.

Figure 5:
FIG. 5 shows intensity distributions of light fluxes L1 to L5.
Figure 5:
Figure 5:
Figure 5:
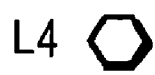
Figure 5:

FIG. 5 shows simplified diagrams of the intensity distributions of the light fluxes L1 to L5 right after being emitted from each cell lenses. There still remains the intensity distribution in each light flux, but, after they are overlapped on the light-receiving surface of the position detection light-receiving element 8, the intensity distributions are averaged as shown in FIG. 6.

In the above explanation, only one row in the arrow direction indicated by Ce is considered. However, since the light flux and the lens array are distributed in the two-dimensional direction, all the cell lenses shown in FIG. 4 are used for averaging. In addition, the more the cell lenses are used, the better the average is obtained.

Figure 6:
FIG. 6 shows an averaged state of intensity distributions.
Figure 7:
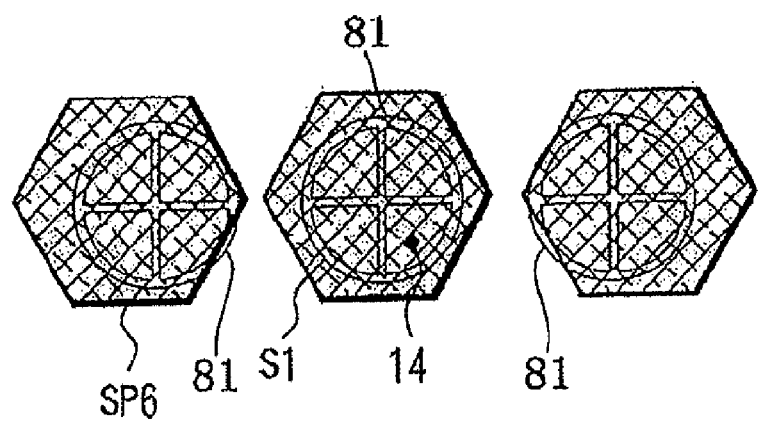
FIG. 7 shows a state where a light-receiving surface is positioned inside the averaged light flux.

The size of the spot SP6 shown in FIG. 6 should be arranged to be smaller than the diameter of the light-receiving portion 81 which is divided into four areas in the position detection light-receiving element 8. When it is larger than the diameter of the light-receiving portion 81, the light-receiving portion 81 is included just inside the averaged light flux as shown in FIG. 7, so that the position change of the spot SP6 cannot be detected. In addition, when the number of cell lenses is small and when the average effect is not sufficient, the size of the spot SP6 is better to be small.

However, when it is too small, the effect of the dead zone of the four-division sensor increases as described in the related art. Accordingly, in order to reduce the effect of the dead zone, the size of the spot SP6 needs to be limited to a range from the size, in which the fraction of the dead zone area occupied in the area of the spot SP6 is 50% or less, to the size, in which the diameter does not exceed the size of the four-division sensor in addition to areas including an installation condition and a tolerance, namely, the size which does not exceed about 90% of the minimum length of the light-receiving surface 81.

Figure 11:
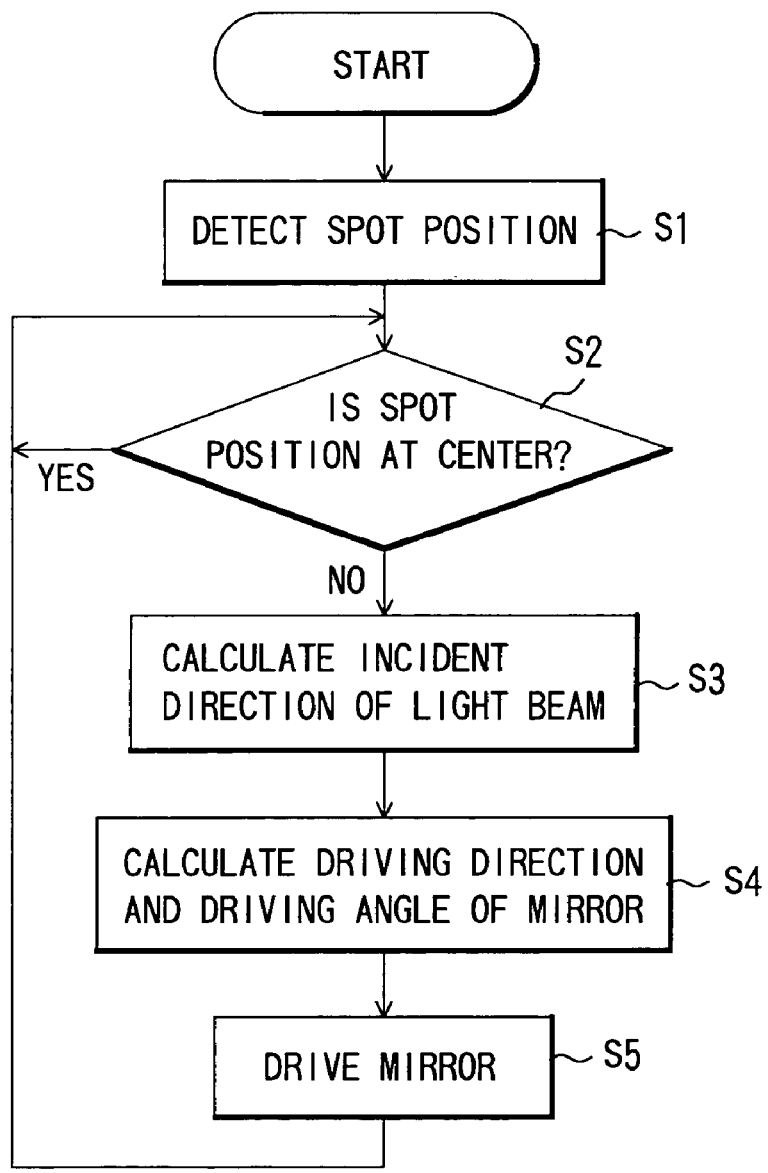
FIG. 11 shows a flow chart for explaining the drive control of a mirror.
Figure 12:
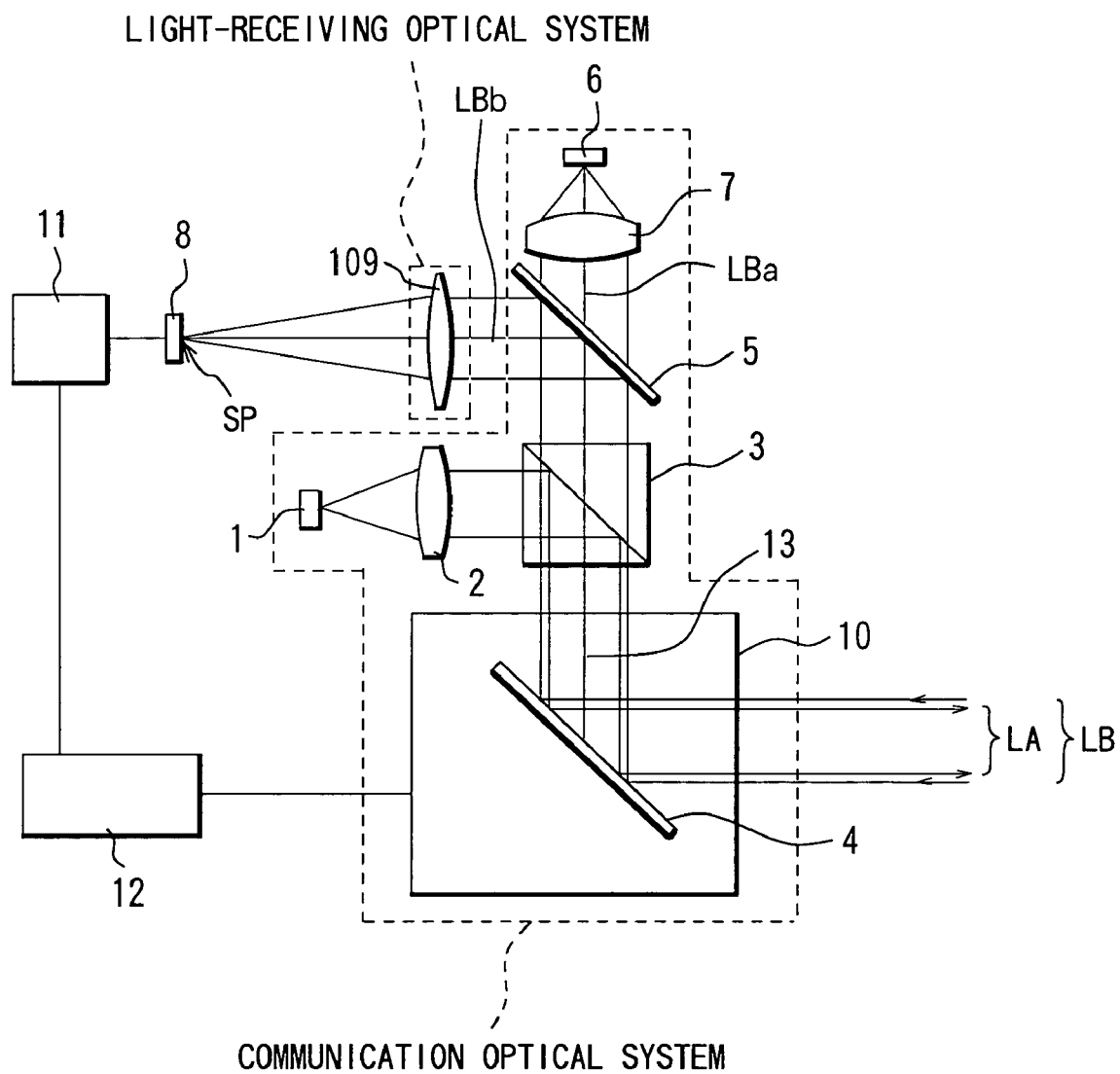
FIG. 12 shows a block diagram of an free-space optics communication apparatus in accordance with the related art.
Figure 13:
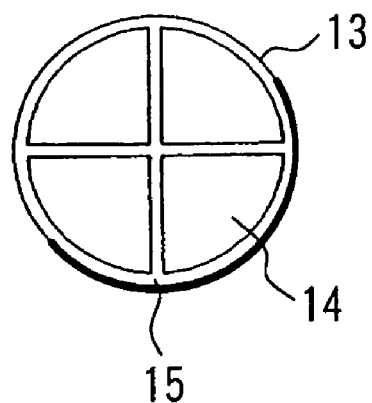
FIG. 13 shows a block diagram of a four-division sensor in accordance with the related art.
Figure 14:
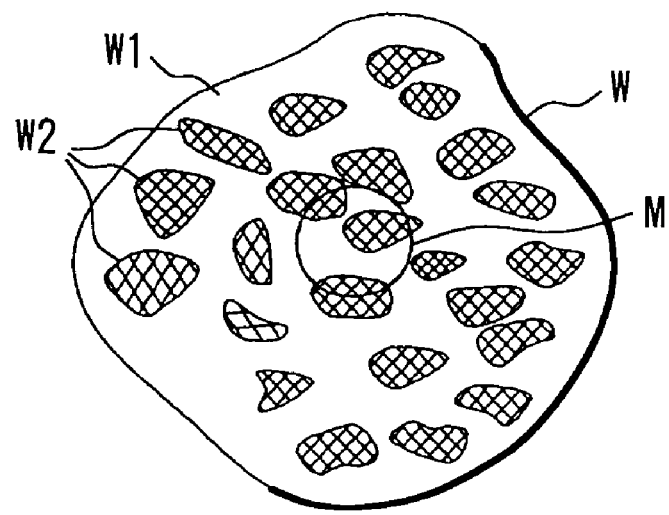
FIG. 14 shows an explanatory diagram in which a micro-fluctuation of the atmosphere is modeled.
Figure 15:
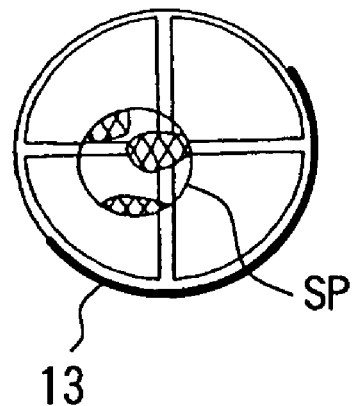
FIG. 15 shows a diagram of a spot in which an intensity distribution is not uniform.

Next, drive control of the mirror 4 will be described with reference to a flow chart shown in FIG. 11. When the received light LB is incident on the position detection light-receiving element 8 and a spot is formed on the light-receiving portion 81, a signal is outputted from the light-receiving portion 81 to a signal processing section 11 in response to the intensity distribution of the spot light (Step 1). The signal processing section 11 evaluates whether the spot position is located at the center based on the signal outputted from the light-receiving portion 81 (Step 2). When the spot position is away from the center, it calculates the incident direction of the received light LB and concurrently outputs an optical axis deviation correction signal generated based on the calculation result to an optical axis direction control section 12 (Step 3).

Further, the optical axis direction control section 12 calculates the driving direction and the driving angle of the mirror 4 based on the optical axis deviation correction signal inputted from the signal processing section 11 and concurrently outputs a driving signal generated by the calculation result to an actuator, which is not shown, as a driving source for the mirror 4 (Step 4).

When the actuator is driven based on the driving signal inputted from the optical axis direction control section 12, the mirror 4 is moved to a predetermined position so that the optical axis of the received light LB coincides with that of the sent light LA (Step 5). Accordingly, the problem can be repressed in that the communication between the first free-space optics communication apparatus 101 and the second free-space optics communication apparatus 102 cannot be performed.

In the embodiment of the present invention, it is described that the direction of the mirror 4 is adjusted so that the optical axis of the received light LB coincides with that of the transmitted light LA, but the direction of the whole apparatus may be changed by a pan head.

In addition, the optical system of the present embodiment may be applied to various apparatuses in addition to the free-space optics communication apparatus and the optical detection apparatus.

Figure 8:
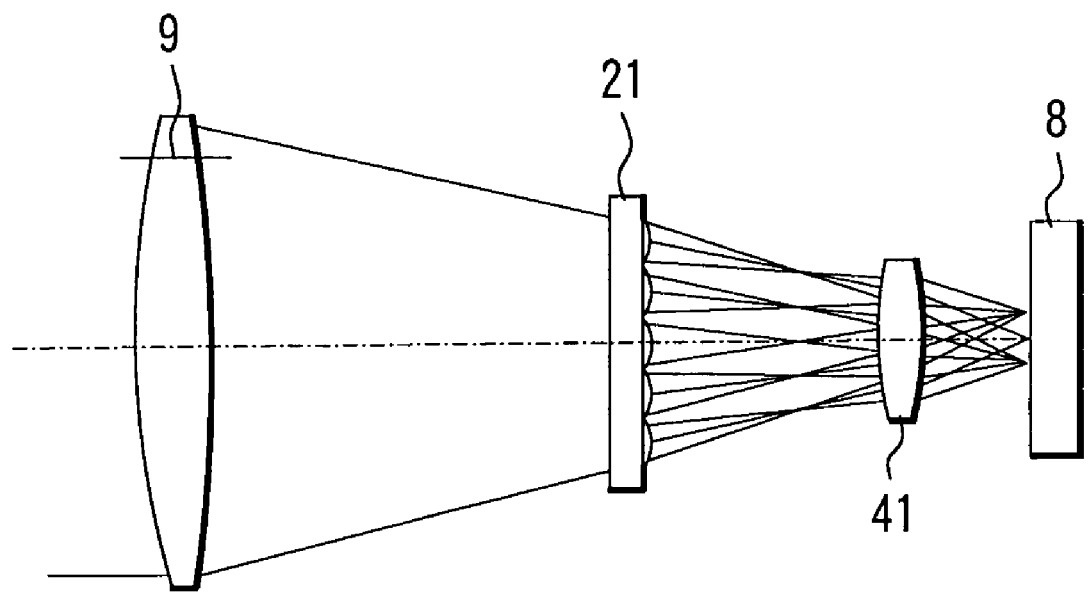
FIG. 8 shows a block diagram of a condensing optical system in which a lens is disposed between a lens array and a position detection light-receiving element.

Furthermore, as shown in FIG. 8, a lens 41 may be disposed between the lens array 21 and the position detection light-receiving element 8 so that the light flux emitted from the lens array 21 may be guided toward the position detection light-receiving element 8. As shown in the same figure, the lens 41 is a convex lens, but a concave lens or a meniscus lens may be employed. In addition, the substrate which constitutes the lens array 21 may be a lens-shaped substrate as well as the flat panel substrate.

Figure 9:
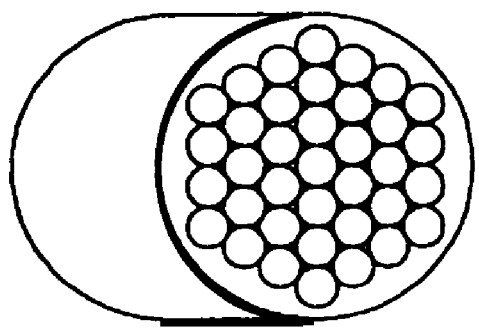
FIG. 9 shows a block diagram of a refractive index distribution type lens of an optical element array.
Figure 10:
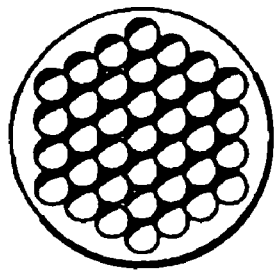
FIG. 10 shows a structural drawing of a mirror group in which a plurality of concave mirrors are disposed in the optical element array.

In the embodiment of the present invention, the lens array is used as an optical element array having a plurality of optical element portions, however, a refractive index distributed-type lens as shown in FIG. 9 may be employed, or a concave mirror array as shown in FIG. 10 may be employed.

In addition, in the received light splitting mirror 5 of the present invention, the amount of light toward the main signal detection light-receiving element is larger than that toward the position detection light-receiving element, but it is obvious that the reversed arrangement is also possible due to the effect of the sensitivity of the light-receiving element or the like.

While preferred embodiments have been described, it is to be understood that modification and variation of the present invention may be made without departing from the scope of the following claims.

"This application claims priority from Japanese Patent Application No. 2003-406175 filed on Dec. 4, 2003, which is hereby incorporated by reference herein."

What is claimed is:

1. An optical detection apparatus comprising:
    an optical system which includes a positive lens converting an incident light flux into a convergent light flux and an optical element array having a plurality of optical element portions and dividing the convergent light flux into plural partial light fluxes; and
    a light-receiving element which receives the partial light fluxes and outputs a signal, the signal representing an intensity distribution of the partial light fluxes and used for detecting a position of the incident light flux of the optical detection apparatus,
    wherein the optical system overlaps the partial light fluxes with each other on the light-receiving element.

2. The optical detection apparatus according to claim 1, wherein the optical element array is a lens array.

3. The optical detection apparatus according to claim 2, wherein the lens array has a light diffusion function or a light condensing function.

4. The optical detection apparatus according to claim 3, wherein the lens array includes at least nine lenses arranged within an effective area of the incident light flux.

5. The optical detection apparatus according to claim 1, wherein the optical system has an optical member which guides the partial light fluxes emitted from the optical element array toward the light-receiving element.

6. The optical detection apparatus according to claim 5, wherein the optical member is a convex lens, a concave lens or a meniscus lens.

7. An optical communication apparatus which performs communication with a counterpart apparatus by light flux transmitted through space, comprising:
    an optical system which includes a positive lens converting an incident light flux entered from the counterpart apparatus into a convergent light flux and an optical element array having a plurality of optical element portions and dividing the convergent light flux into plural partial light fluxes; and
    a light-receiving element which receives the partial light fluxes and outputs a signal, the signal representing an intensity distribution of the partial light fluxes and used for detecting a position of the light flux entered from the counterpart apparatus,
    wherein the optical system overlaps the partial light fluxes with each other on the light-receiving element.

8. The optical communication apparatus according to claim 7, further comprising:
    an optical communication system which performs communication with the counterpart apparatus by means of the light flux; and
    a controller which controls a direction of the free-space optics communication apparatus or the optical communication system based on the signal output from the light-receiving element.

9. The optical communication apparatus according to claim 7, further comprising:
    a deflecting optical element which is adapted to guides the light flux from the counterpart apparatus to the optical system,
    wherein the deflecting optical element is driven based on the signal output from the light-receiving element.

10. An optical detection apparatus comprising:

a light-receiving element; and an optical system which includes a positive lens and an optical element array having a plurality of optical element portions, the optical system dividing an incident light flux into a plurality of partial light fluxes and overlapping the partial light fluxes with each other on the light-receiving element by using the positive lens and the optical element array, wherein the light-receiving element receives the partial light fluxes and outputs a signal which represents an intensity distribution of the partial light fluxes and is used for detecting a position of the incident light flux of the optical detection apparatus.

11. An optical communication apparatus which performs communication with a counterpart apparatus by light flux transmitted through space, comprising:

a light-receiving element; and an optical system which includes a positive lens and an optical element array having a plurality of optical element portions, the optical system dividing the light flux entered from the counterpart apparatus into a plurality of partial light fluxes and overlapping the partial light fluxes with each other on the light-receiving element by using the positive lens and the optical element array, wherein the light-receiving element receives the partial light fluxes and outputs a signal which represents an intensity distributions of the partial light fluxes and is used for detecting a position of the light flux entered from the counterpart apparatus.

* * * * *